United States Patent
Dubelman et al.

(10) Patent No.: US 11,628,618 B2
(45) Date of Patent: *Apr. 18, 2023

(54) ADDITIVE MANUFACTURING METHOD FOR FUNCTIONALLY GRADED MATERIAL

(71) Applicant: General Electric Company, Schenectady, NY (US)

(72) Inventors: Meredith Elissa Dubelman, Liberty Township, OH (US); Xi Yang, Mason, OH (US); Mary Kathryn Thompson, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/375,497

(22) Filed: Jul. 14, 2021

(65) Prior Publication Data

US 2021/0339468 A1 Nov. 4, 2021

Related U.S. Application Data

(63) Continuation of application No. 16/231,539, filed on Dec. 23, 2018, now Pat. No. 11,104,066.

(51) Int. Cl.
*B29C 64/165* (2017.01)
*B29C 64/245* (2017.01)
(Continued)

(52) U.S. Cl.
CPC .......... *B29C 64/165* (2017.08); *B29C 64/245* (2017.08); *B29C 64/268* (2017.08);
(Continued)

(58) Field of Classification Search
None
See application file for complete search history.

(56) References Cited

U.S. PATENT DOCUMENTS

| 50,538,014 | | 8/1991 | Pratt |
| 5,976,448 | A | 11/1999 | Haruta |

(Continued)

FOREIGN PATENT DOCUMENTS

| JP | H0499203 | 3/1992 |
| JP | H05286040 A | 11/1993 |
| WO | 2017222602 | 12/2017 |

OTHER PUBLICATIONS

Machine English translation of JPH0499203A, Accessed Apr. 6, 2021 (Year: 1992).*

(Continued)

*Primary Examiner* — Jacob T Minskey
*Assistant Examiner* — Adrianna N Konves
(74) *Attorney, Agent, or Firm* — Dinsmore & Shohl LLP

(57) ABSTRACT

A method for producing a functionally graded component layer-by-layer includes: depositing radiant-energy-curable resin on a build surface defined by a resin support, the resin containing filler including at least two groups of particles with different physical properties; allowing the filler to settle such that the groups of particles separate from each other, defining at least two regions within the resin; positioning a stage relative to the build surface so as to define a layer increment in the resin; selectively curing the resin using an radiant energy applied in a specific pattern so as to define the geometry of a cross-sectional layer of the component; moving the build surface and the stage relatively apart so as to separate the component from the build surface; repeating at least the steps of positioning and selectively curing for a plurality of layers, until the component is complete.

19 Claims, 4 Drawing Sheets

(51) Int. Cl.
  B29C 64/35 (2017.01)
  B29C 64/268 (2017.01)
  *B33Y 10/00* (2015.01)
  *B33Y 30/00* (2015.01)
  *B33Y 40/00* (2020.01)

(52) U.S. Cl.
  CPC ............... B29C 64/35 (2017.08); *B33Y 10/00* (2014.12); *B33Y 30/00* (2014.12); *B33Y 40/00* (2014.12)

(56) References Cited

U.S. PATENT DOCUMENTS

| | | |
|---|---|---|
| 6,203,966 B1 | 3/2001 | Tamura |
| 7,572,403 B2 | 8/2009 | Gu |
| 8,980,971 B2 | 3/2015 | Ueda et al. |
| 9,932,841 B2 | 4/2018 | Staroselsky |
| 2011/0017645 A1 | 1/2011 | Hongo et al. |
| 2013/0015609 A1 | 1/2013 | Landau |
| 2014/0183792 A1 | 7/2014 | Leu |
| 2016/0312037 A1 | 10/2016 | Zhao |
| 2016/0332386 A1* | 11/2016 | Kuijpers ............... B29C 64/135 |
| 2018/0333911 A1 | 11/2018 | Lin et al. |
| 2018/0361666 A1 | 12/2018 | Adzima |
| 2020/0001525 A1 | 1/2020 | Wynne et al. |
| 2020/0197138 A1 | 6/2020 | Parkar et al. |

OTHER PUBLICATIONS

Japanese Patent Application No. 2019-231655 Office Action, dated Mar. 22, 2021 (6 pages with English Translation).

Extended European Search Report issued in connection with related EP Application No. 19214493.9 dated Jun. 17, 2020.

Light curing 3D printing technology (1st Edition), Wang Yongxin et al., pp. 18-20, Huazhong University of science and Technology Press, Nov. 2018.

Chinese Patent Application No. 2019113188173.7 Office Action, dated Jun. 3, 2021.

Japanese Patent Application No. 2019-231655 Office Action, dated Jun. 29, 2021.

\* cited by examiner

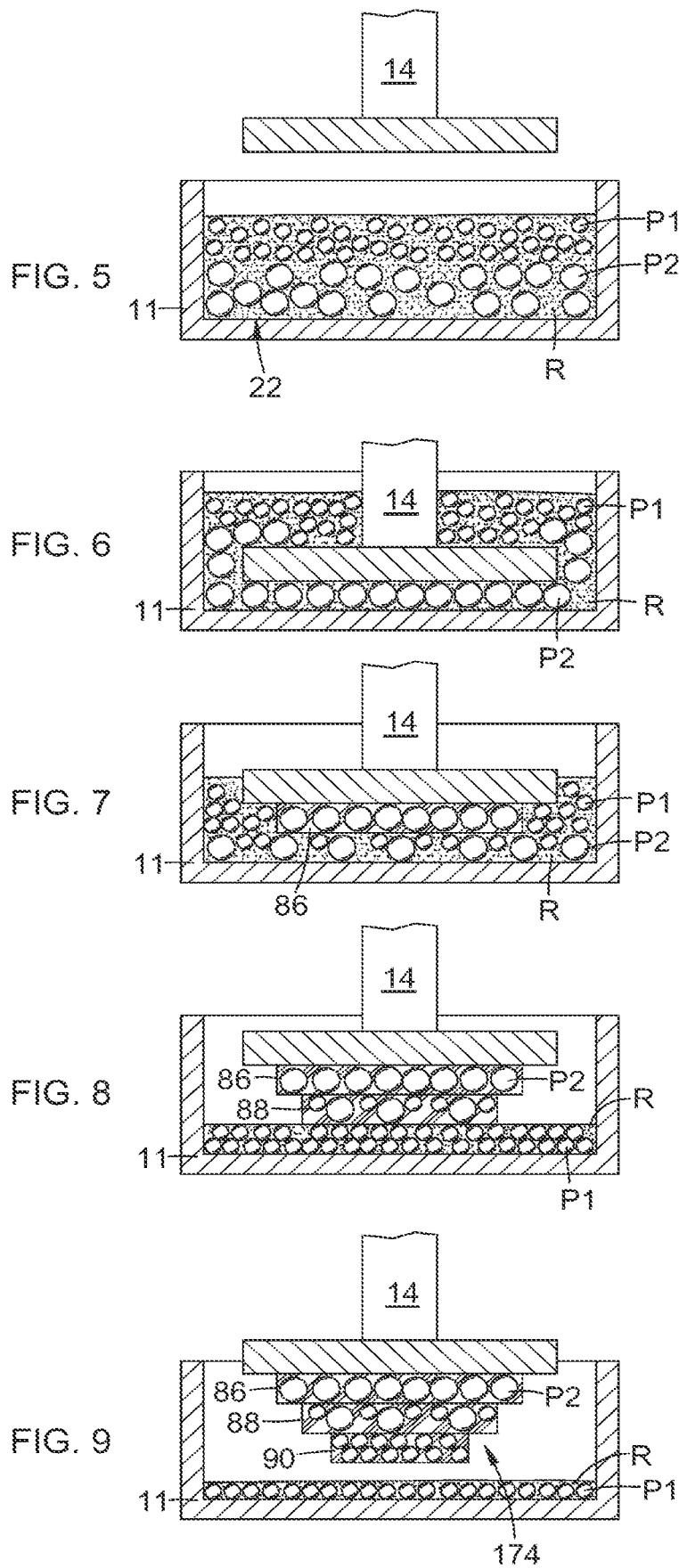

ADDITIVE MANUFACTURING METHOD FOR FUNCTIONALLY GRADED MATERIAL

CROSS REFERENCE TO RELATED APPLICATIONS

The present application is a continuation application of and claims priority to and the benefit of U.S. Non-Provisional patent application Ser. No. 16/231,539 filed on Dec. 23, 2018, the contents of which are hereby incorporated by reference in its entirety.

BACKGROUND OF THE INVENTION

This invention relates generally to additive manufacturing, and more particularly to methods for curable material handling in additive manufacturing.

Additive manufacturing is a process in which material is built up layer-by-layer to form a component. Stereolithography is a type of additive manufacturing process which employs a vat of liquid radiant-energy curable photopolymer "resin" and a curing energy source such as a laser. Similarly, DLP 3D printing employs a two-dimensional image projector to build components one layer at a time. For each layer, the projector flashes a radiation image of the cross-section of the component on the surface of the liquid or through a transparent object which defines a constrained surface of the resin. Exposure to the radiation cures and solidifies the pattern in the resin and joins it to a previously-cured layer. Other types of additive manufacturing processes utilize other types of radiant energy sources to solidify patterns in resin.

Functionally graded materials vary in composition and structure gradually over volume, resulting in corresponding changes in the properties of the material. The materials can be designed for specific function and applications. Various approaches based on the bulk (particulate processing), preform processing, layer processing and melt processing are traditionally used to fabricate the functionally graded materials.

Functionally graded materials are useful in a variety of applications where a single material is not suitable and where a discrete boundary between two different materials is not functional (for example, a ceramic coating on top of a metal part; the coating tends to flake off due to high mismatch in the coefficient of thermal expansion (CTE).

There is a need for a method of producing functionally graded materials through additive manufacturing.

BRIEF DESCRIPTION OF THE INVENTION

At least one of these problems is addressed by an additive manufacturing method in which a resin has particles with different properties that are allowed to settle in different regions. The settled resin can be cured to create a functionally graded structure.

According to one aspect of the technology described herein, a method is provided for producing a functionally graded component layer-by-layer, including the steps of: depositing resin on a build surface defined by a resin support, wherein the resin is radiant-energy-curable and contains filler including at least two groups of particles with different physical properties; allowing the filler to settle such that the at least two groups of particles separate from each other, so as to define at least two regions within the resin; positioning a stage relative to the build surface so as to define a layer increment in the resin deposited on the build surface; selectively curing the resin using an application of radiant energy in a specific pattern so as to define the geometry of a cross-sectional layer of the component; moving the build surface and the stage relatively apart so as to separate the component from the build surface; and repeating at least the steps of positioning and selectively curing for a plurality of layers, until the component is complete.

BRIEF DESCRIPTION OF THE DRAWINGS

The invention may be best understood by reference to the following description taken in conjunction with the accompanying drawing figures in which:

FIG. 5 is a cross-sectional view of a vat containing settled resin, with a stage positioned above the vat;

FIG. 6 is a cross-sectional view of the vat of FIG. 5 with a stage lowered into place for formation of a first layer;

FIG. 7 is a cross-sectional view of the vat of FIG. 5 with a stage lowered into place for formation of a second layer;

FIG. 8 is a cross-sectional view of the vat of FIG. 5 of the stage lowered into place for formation of a third layer; and FIG. 9 is a cross-sectional view of the vat of FIG. 5 with the stage retracted, having three formed layers attached thereto.

DETAILED DESCRIPTION OF THE INVENTION

Figure 1:
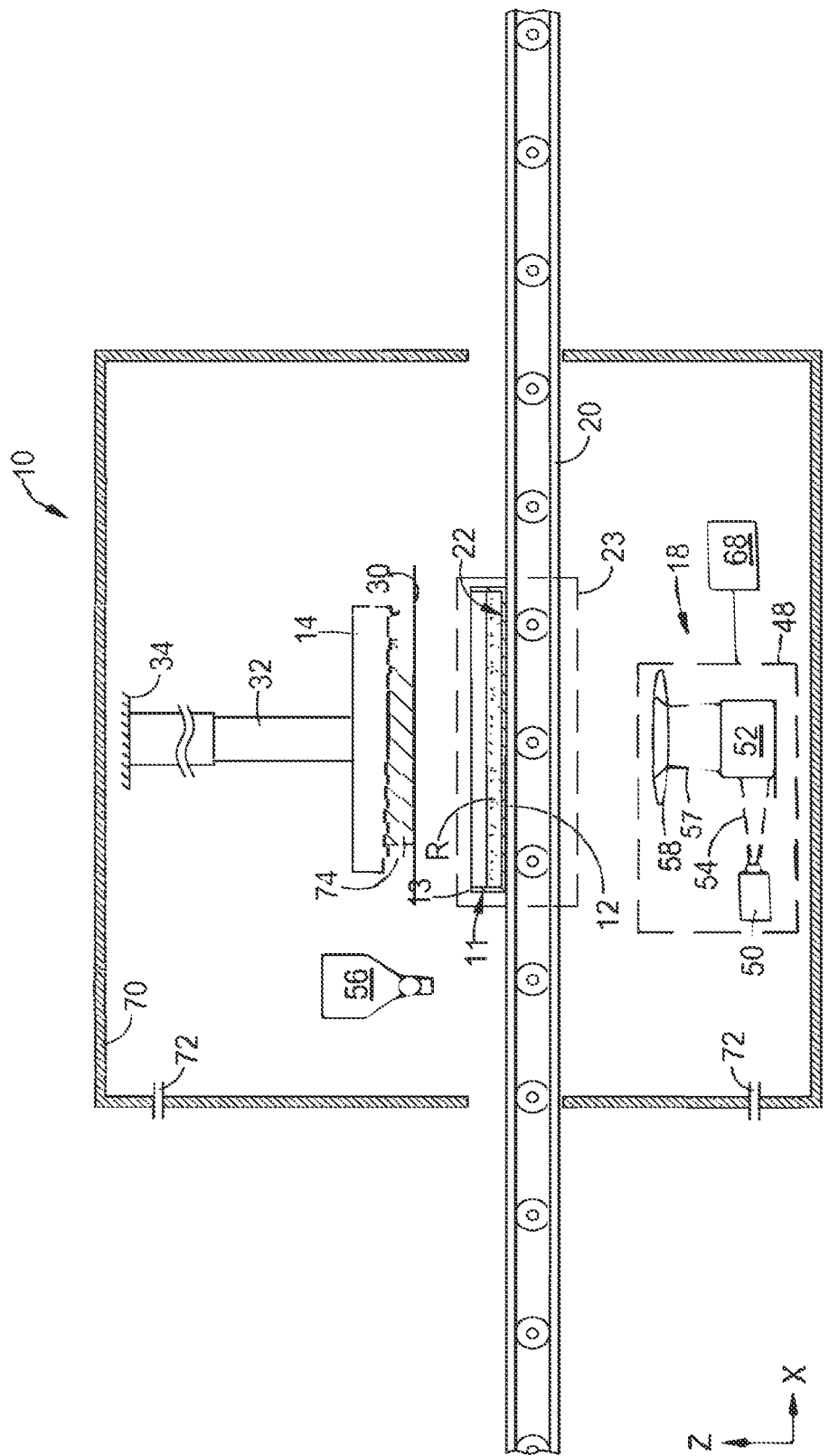
FIG. 1 is a schematic side elevation view of an exemplary additive manufacturing apparatus.

Referring to the drawings wherein identical reference numerals denote the same elements throughout the various views, FIG. 1 illustrates schematically an example of one type of suitable apparatus 10 for carrying out an embodiment of an additive manufacturing method as described herein. It will be understood that other configurations of equipment may be used to carry out the method. Basic components of the exemplary apparatus 10 include one or more vats 11, a stage 14, a radiant energy apparatus 18, and (optionally) a vat transport mechanism 20.

The vat 11 includes a floor 12 and a perimeter or walls 13 such that the vat is configured to receive a radiant-energy-curable resin R. In one embodiment, the floor 12 is transparent or includes a portion or portions that are transparent. As used herein, the term "transparent" refers to a material which allows radiant energy of a selected wavelength to pass through. For example, as described below, the radiant energy used for curing could be ultraviolet light or laser light in the visible spectrum. Non-limiting examples of transparent materials include polymers, glass, and crystalline minerals such as sapphire or quartz. The floor 12 could be made up of two or more subcomponents, some of which are transparent. The example shown here is a "bottom-up configuration". In other embodiments (not shown), the vat 11 need not be transparent, as the radiant energy apparatus could be positioned across from the vat 11 (referred to as a "top-down" configuration).

The floor 12 of the vat 11 defines a build surface 22 which may be planar. For purposes of convenient description, the build surface 22 may be considered to be oriented parallel to an X-Y plane of the apparatus 10, and a direction perpendicular to the X-Y plane is denoted as a Z-direction (X, Y, and Z being three mutually perpendicular directions).

While a vat 11 is used herein as an example to explain the principles of the invention, this is only one type of resin support that may be used to define a build surface. For example, instead of a vat, a plate could be used, or a flexible foil, e.g. of the type used in conventional tape casting.

The build surface 22 may be configured to be "non-stick", that is, resistant to adhesion of cured resin. The non-stick properties may be embodied by a combination of variables such as the chemistry of the floor 12, its surface finish, and/or applied coatings. In one example, a permanent or semi-permanent non-stick coating may be applied. One non-limiting example of a suitable coating is polytetrafluoroethylene ("PTFE"). In one example, all or a portion of the build surface 22 of vat 11 may incorporate a controlled roughness or surface texture (e.g. protrusions, dimples, grooves, ridges, etc.) with nonstick properties. In one example, the floor 12 may be made in whole or in part from an oxygen-permeable material.

An area or volume immediately surrounding the location of the vat 11 (when it is positioned for a curing step to take place) is defined as a "build zone", denoted by a dashed-line box 23.

For purposes of simplified description, the exemplary vat 11 is shown as being statically positioned, with the entire build cycle described herein occurring with the vat 11 in the build zone 23. Alternatively, the vat transport mechanism 20 may be provided for transporting vats 11 into and out of the build zone 23 so that the vats 11 could be prepared (e.g. filled, emptied, and/or cleaned) at a location remote to the build zone 23. In other words, the vats 11 could be handled as prefilled "cartridges".

In the illustrated example, one possible vat transport mechanism 20 is shown in the form of a conveyor belt which extends laterally through the build zone 23. Other types of mechanisms suitable for this purpose include, for example, mechanical linkages, rotary tables, or robot effector arms. It will be understood that the vats 11 may be moved into or out of the build zone 23 from any desired direction.

Referring now to the components of apparatus 10, the stage 14 is a structure defining a planar surface 30 which is capable of being oriented parallel to the build surface 22 when the vat 11 is positioned in the build zone 23. Some means are provided for moving the stage 14 relative to the vat 11, and thus to the build surface 22, parallel to the Z-direction. In FIG. 1, these means are depicted schematically as a simple actuator 32 connected between the stage 14 and a stationary support structure 34, with the understanding that devices such as ballscrew electric actuators, linear electric actuators, delta drives, pneumatic cylinders, or hydraulic cylinders may be used for this purpose. In addition to, or as an alternative to, making the stage 14 movable, the floor 12 and/or the entire vat 11 could be movable parallel to the Z-direction.

New resin R and/or filler may be introduced into a vat 11 from a new material reservoir 56 which may be movable into and out of the build zone 23 by means of appropriate actuators. Means may be provided for mixing the resin R to ensure the material is homogenous (including for example, any or all of: new resin R, used resin R, new filler, used filler).

The radiant energy apparatus 18 may comprise any device or combination of devices operable to generate and project radiant energy on the resin R in a suitable pattern and with a suitable energy level and other operating characteristics to cure the resin R during the build process, described in more detail below.

In one exemplary embodiment as shown in FIG. 1, the radiant energy apparatus 18 may comprise a "projector" 48, used herein generally to refer to any device operable to generate a radiant energy patterned image of suitable energy level and other operating characteristics to cure the resin R. As used herein, the term "patterned image" refers to a projection of radiant energy comprising an array of individual pixels. Non-limiting examples of patterned imaged devices include a DLP projector or another digital micromirror device, a 2D array of LEDs, a 2D array of lasers, or optically addressed light valves. In the illustrated example, the projector 48 comprises a radiant energy source 50 such as a UV lamp, an image forming apparatus 52 operable to receive a source beam 54 from the radiant energy source 50 and generate a patterned image 57 to be projected onto the surface of the resin R, and optionally focusing optics 58, such as one or more lenses.

The radiant energy source 50 may comprise any device operable to generate a beam of suitable energy level and frequency characteristics to cure the resin R. In the illustrated example, the radiant energy source 50 comprises a UV flash lamp.

The image forming apparatus 52 may include one or more mirrors, prisms, and/or lenses and is provided with suitable actuators, and arranged so that the source beam 54 from the radiant energy source 50 can be transformed into a pixelated image in an X-Y plane coincident with the surface of the resin R. In the illustrated example, the image forming apparatus 52 may be a digital micro-mirror device. For example, the projector 48 may be a commercially-available Digital Light Processing ("DLP") projector.

As an option, the projector 48 may incorporate additional means such as actuators, mirrors, etc. configured to selectively move the image forming apparatus 52 or other part of the projector 48, with the effect of rastering or shifting the location of the patterned image 57 of the build surface 22. Stated another way, the patterned image may be moved away from a nominal or starting location. This permits a single image forming apparatus 52 to cover a larger build area, for example. Means for mastering or shifting the patterned image from the image forming apparatus 52 are commercially available. This type of image projection may be referred to herein as a "tiled image".

Figure 2:
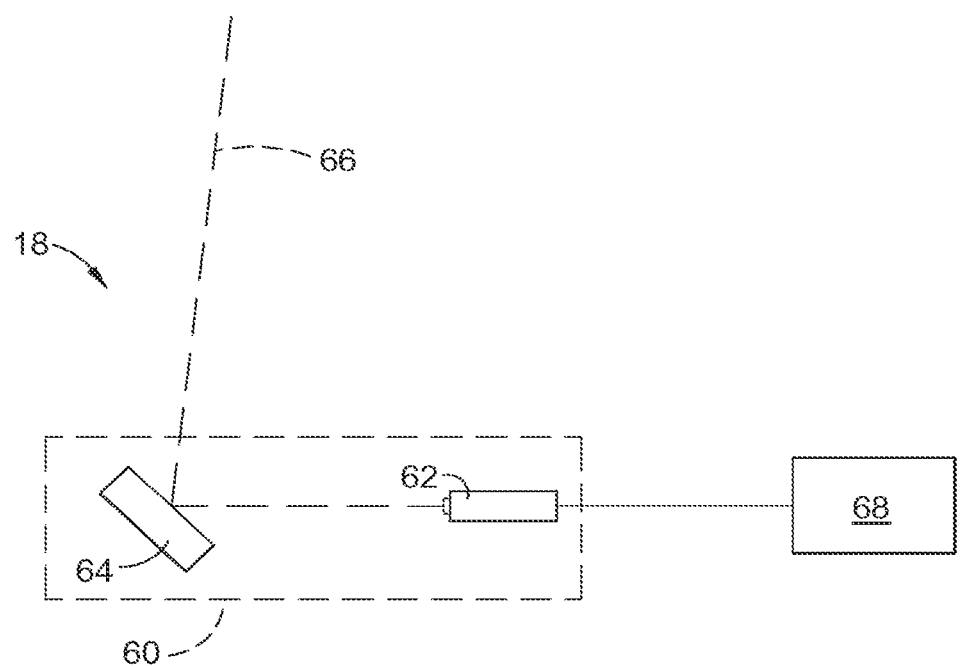
FIG. 2 is a schematic diagram of an exemplary scanned beam apparatus.

In another exemplary embodiment as shown in FIG. 2, in addition to other types of radiant energy devices, the radiant energy apparatus 18 may comprise a "scanned beam apparatus" 60 used herein to refer generally to refer to any device operable to generate a radiant energy beam of suitable energy level and other operating characteristics to cure the resin R and to scan the beam over the surface of the resin R in a desired pattern. In the illustrated example, the scanned beam apparatus 60 comprises a radiant energy source 62 and a beam steering apparatus 64.

The radiant energy source 62 may comprise any device operable to generate a beam of suitable power and other operating characteristics to cure the resin R. Non-limiting examples of suitable radiant energy sources include lasers or electron beam guns.

The beam steering apparatus 64 may include one or more mirrors, prisms, and/or lenses and may be provided with suitable actuators, and arranged so that a beam 66 from the radiant energy source 62 can be focused to a desired spot size and steered to a desired position in plane coincident with the surface of the resin R. The beam 66 may be referred to herein as a "build beam". Other types of scanned beam apparatus may be used. For example, scanned beam sources using multiple build beams are known, as are scanned beam sources in which the radiant energy source itself is movable by way of one or more actuators.

The apparatus 10 may include a controller 68. The controller 68 in FIG. 1 is a generalized representation of the hardware and software required to control the operation of the apparatus 10, the stage 14, the radiant energy apparatus 18, and the various actuators described above. The controller 68 may be embodied, for example, by software running on one or more processors embodied in one or more devices such as a programmable logic controller ("PLC") or a microcomputer. Such processors may be coupled to sensors and operating components, for example, through wired or wireless connections. The same processor or processors may be used to retrieve and analyze sensor data, for statistical analysis, and for feedback control.

Optionally, the components of the apparatus 10 may be surrounded by a housing 70, which may be used to provide a shielding or inert gas atmosphere using gas ports 72. Optionally, pressure within the housing 70 could be maintained at a desired level greater than or less than atmospheric. Optionally, the housing 70 could be temperature and/or humidity controlled. Optionally, ventilation of the housing 70 could be controlled based on factors such as a time interval, temperature, humidity, and/or chemical species concentration.

The resin R comprises a material which is radiant-energy curable and which is capable of adhering or binding together the filler in the cured state. As used herein, the term "radiant-energy curable" refers to any material which solidifies in response to the application of radiant energy of a particular frequency and energy level. For example, the resin R may comprise a known type of photopolymer resin containing photo-initiator compounds functioning to trigger a polymerization reaction, causing the resin to change from a liquid state to a solid state. Alternatively, the resin R may comprise a material which contains a solvent that may be evaporated out by the application of radiant energy. The uncured resin R may be provided in solid (e.g. granular) or liquid form including a paste or slurry.

Generally, the resin R should be flowable. According to the illustrated embodiment, the resin R is preferably a relatively low viscosity liquid that is self-levelling. The resin R can be a liquid having a higher viscosity such that contact with the stage 14 is required to level the resin R. The composition of the resin R may be selected as desired to suit a particular application. Mixtures of different compositions may be used.

The resin R may be selected to have the ability to out-gas or burn off during further processing, such as the sintering process described below.

The resin R incorporates a filler. The filler may be pre-mixed with resin R, then loaded into the new material reservoir 56. The filler comprises particles, which are conventionally defined as "a very small bit of matter". The filler may comprise any material which is chemically and physically compatible with the selected resin R. The particles may be regular or irregular in shape, may be uniform or non-uniform in size, and may have variable aspect ratios. For example, the particles may take the form of powder, of small spheres, polyhedrons, or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used.

Figure 3:
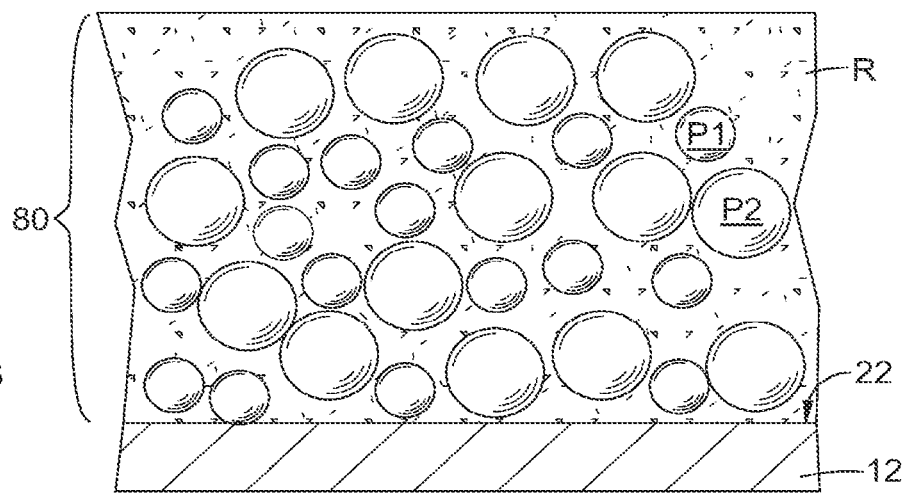
FIG. 3 is a cross-sectional view of a small portion of resin deposited in a vat, prior to a settling step.

The filler may include at least two groups of particles having differing physical properties. For purposes of description, FIG. 3 shows an example wherein a layer 80 of resin R includes two groups of particles labeled "P1" and "P2", respectively. The two groups of particles P1 and P2 vary in some property or combination of properties so as to give them different "buoyancies" within the resin R. For example, this "buoyancy" will determine a particle's tendency to float to the top of the resin layer, fall to the bottom of the resin layer, migrate to a specific stratum or vertical position, or maintain its position in a given stratum or a specific vertical position. Examples of such properties affecting buoyancy include: particle density, resin density, particle size in any dimension, particle volume, particle shape, and/or the presence of other particles and their various properties. For example, particles P1 and P2 could be spherical particles with identical diameters and thus identical volumes, but different densities. As another example, particles P1 and P2 could be spherical particles with identical densities but different diameters and thus different volumes. The particles P1 and P2 need not have any specific buoyancy relative to the resin R (e.g., positive, neutral, or negative). Rather, their buoyancies should be different from each other. The migration of particles within the resin will occur over time. The time constant (the time required for a given particle to migration to a given position or stratum within the resin) will depend at least on the downward force of gravity, the upward force of the resin displaced by the particle, and the friction (including but not limited to adhesion, cohesion, stiction and drag force) between a given particle and any surrounding particles and/or resin which will resist any motion in any direction.

Figure 4:
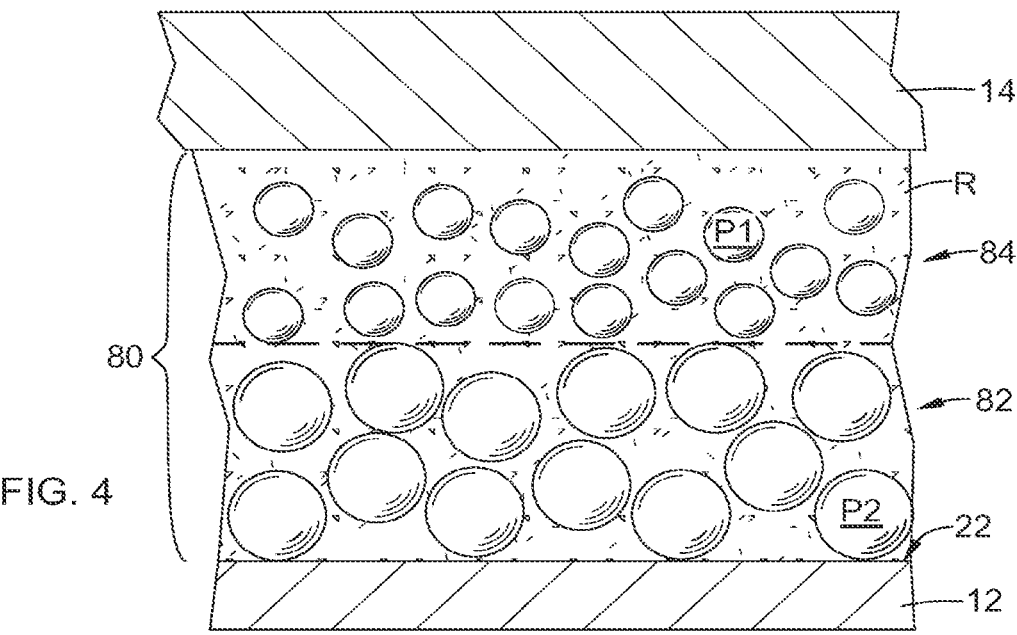
FIG. 4 is a cross-sectional view of the resin shown in FIG. 3, subsequent to settling.

FIG. 3 depicts the resin with particles P1 and P2 in a mixed condition. As will be described in more detail below, the differing forces acting on the particles P1 and P2 will cause them to seek different levels in the resin R when given an opportunity to settle. For example, as shown in FIG. 4 the less buoyant particles P2 (shown as being physically larger for illustration purposes) will fall towards the bottom of a vat, while the more buoyant particles P1 will stay towards the top.

The filler may be "fusible", meaning it is capable of consolidation into a mass upon via application of sufficient energy. For example, fusibility is a characteristic of many available powders including but not limited to: polymeric, ceramic, glass, and metallic.

The proportion of filler to resin R may be selected to suit a particular application. Generally, any amount of filler may be used so long as the combined material is capable of flowing and being leveled, and there is sufficient resin R to hold together the particles of the filler in the cured state.

Examples of the operation of the apparatus 10 will now be described in detail with reference to FIGS. 1, 3, and 4. It will be understood that, as a precursor to producing a component and using the apparatus 10, the component 74 is software modeled as a stack of planar layers arrayed along the Z-axis. Depending on the type of curing method used, each layer may be divided into a grid of pixels. The actual component 74 may be modeled and/or manufactured as a stack of dozens or hundreds of layers. Suitable software modeling processes are known in the art.

Initially, a vat 11 is prepared with resin R and positioned in the build zone 23. If the vat 11 is a prefilled cartridge, then the steps of (optionally) applying a nonstick material to the build surface 22 and filling the vat 11 with resin described below will have been completed offline.

If the vat 11 is not provided as a prefilled cartridge, then the vat 11 would need to be filled with resin. This filling step could be carried out in the build zone 23, using the new material reservoir 56, or using another new material reservoir (not shown) in some other location. As used herein, the term "filling" refers generally to the act of dispensing, loading, or placing resin R into the vat 11 and does not necessarily imply that the vat 11 be completely filled, or filled to maximum capacity. Thus, the act of "filling" may be partial or complete. Optionally, as a preliminary step in the filling process, a nonstick material may be applied to the build surface 22 prior to resin application. For example, a release agent such as polyvinyl alcohol ("PVA") may be applied to the build surface 22 prior to each layer being built. In another example, a sacrificial layer having non-stick properties may be applied. A nonstick film, e.g. a polymer sheet or film can be applied to the build surface 22. The film can be removed after a layer is cured.

When filling occurs within the build zone 23, the new material reservoir 56 is used to apply resin R to the build surface 22. The quantity of resin R applied may be sufficient for one layer 80 or for multiple layers. As will be explained in more detail below, different methods may be used to produce a functionally-graded component, depending on the fill level of the vat 11. It is noted that different vats 11 may be filled to different levels depending on the component geometry and chosen build style. Furthermore, the layer thickness does not have to be uniform from layer to layer. So even though the vat 11 is being filled for just one layer at a time, if the layer thickness changes then so would the vat fill level.

Optionally, different layers may comprise two or more different material combinations of resin R and/or filler. As used herein, the term "combination" refers to any difference in either of the constituents. So, for example, a particular resin composition mixed with either of two different filler compositions would represent two different material combinations. For example, one layer may comprise a first combination of resin R and filler, and a second layer may comprise a different combination of resin R and filler. Stated another way, any desired resin and any desired filler can be used for any given layer. The different materials may be provided, for example, by providing multiple cartridges or prefilled vats 11 filled with different materials, or by providing two or more new material reservoirs 56 of the type seen in FIG. 1. Different materials from different reservoirs may be mixed in a particular vat 11, or they may be mixed at some other location before supplying them to a vat 11.

After the material is deposited, it is allowed to settle for a predetermined time interval. The differences in buoyancy and friction between the different particles will cause less buoyant (e.g., denser or larger or more uniform) particles to remain at and/or fall to the bottom, while more buoyant (e.g. less dense or smaller or more irregular) particles to move to and/or remain at the top. For example, FIG. 4 shows an example where the groups of particles P1 and P2 shown in FIG. 3 have settled. The particles P1 and P2 are segregated from each other, resulting in two distinct regions in the layer 80, e.g. a lower region 82 and an upper region 84. Where more than two different groups of particles are used, they could form multiple stratified regions in the layer 80. Optionally, settling may be encouraged by gently moving the vat 11 (e.g., by low-displacement tilting or shaking).

After the material is deposited, the apparatus 10 is positioned to define a selected layer increment. The layer increment is defined by some combination of the depth within the vat 11 to which the resin is filled and the operation of the stage 14. For example, the stage 14 could be positioned such that the upper surface 30 is just touching the applied resin R as shown in FIG. 4, or the stage 14 could be used to compress and displace the resin R to positively define the layer increment. The layer increment affects the speed of the additive manufacturing process and the resolution of the component 74. The layer increment can be variable, with a larger layer increment being used to speed the process in portions of a component 74 not requiring high accuracy, and a smaller layer increment being used where higher accuracy is required, at the expense of process speed.

In general, where a vat 11 is to be used to produce a single functionally-graded layer at a time, the layer 80 of loaded resin in the vat 11 after coating should be approximately equal to the desired build layer (e.g. slice thickness) of the component 74 to ensure both material regions 82, 84 are cured during exposure.

Once the resin R has been applied and the layer increment defined, the radiant energy apparatus 18 is used to cure a two-dimensional cross-section or layer of the component 74 being built.

Where a projector 48 is used, the projector 48 projects a patterned image 57 representative of the cross-section of the component 74 through the floor 12 to the resin R. This process is referred to herein as "selective" curing. It will be understood that photopolymers undergo degrees of curing. In many cases, the radiant energy apparatus 18 would not fully cure the resin R. Rather, it would partially cure the resin R enough to "gel" and then a post-cure process (described below) would cure the resin R to whatever completeness it can reach. It will also be understood that, when a multi-layer component is made using this type of resin R, the energy output of the radiant energy apparatus 18 may be carefully selected to partially cure or "under-cure" a previous layer, with the expectation that when the subsequent layer is applied, the energy from that next layer will further the curing of the previous layer. In the process described herein, the term "curing" or "cured" may be used to refer to partially-cured or completely-cured resin R. During the curing process, radiant energy may be supplied to a given layer in multiple steps (e.g. multiple flashes) and also may be supplied in multiple different patterns for a given layer. This allows different amounts of energy to be applied to different parts of a layer.

The exposure to the radiant energy will cure both regions 82, 84 of the layer 80 at the same time, so long as the total thickness of the layer 80 is equal or less than the penetration depth of the radiant energy. This will result in the creation of a multi-material layer which is functionally graded.

Once curing of the first layer is complete, the stage 14 is separated from the floor 12, for example by raising the stage 14 using the actuator 32.

Optionally, the component 74 and/or the stage 14 may be cleaned to remove uncured resin R, debris, or contaminants between curing cycles. The cleaning process may be used for the purpose of removing resin R that did not cure or resin R that did not cure enough to gel during the selective curing step described above. For example, it might be desired to clean the component 74 and/or the stage 14 to ensure that no additional material or material contamination is present in the final component 74. For example, cleaning could be done by contacting the component 74 and/or the stage 14 with a cleaning fluid such as a liquid detergent or solvent.

Subsequent to separation, the used vat 11 may be cleaned or otherwise rejuvenated and prepared for re-use by removing uncured resin R and other debris from the build surface 22. Non-limiting examples of suitable cleaning processes include brushing, abrading, scraping, vacuuming or blowing, absorbing, wiping, solvent rinsing, or combinations thereof. The particular process or mechanism used to clean or otherwise rejuvenate the vat 11 is not specifically relevant to the present invention. It will be understood that the process of cleaning or otherwise rejuvenating could be carried out in a remote location away from the apparatus 10. The new material reservoir 56 would be used to apply resin R to the build surface 22 to ready it for curing again.

This cycle of preparing a vat 11, filling the vat 11 with resin R as needed, allowing the particles to settle, incrementing a layer, and selectively curing is repeated until the entire component 74 is complete.

Where a scanned beam apparatus is used instead of a projector, the radiant energy source 62 emits a beam 66 and the beam steering apparatus 64 is used to cure the resin R by steering a focal spot of the build beam 66 over the exposed resin R in an appropriate pattern. The cycle of cycle of loading a vat 11, filling the vat 11 with resin R, and incrementing a layer is repeated. The radiant energy source 62 again emits a build beam 66 and the beam steering apparatus 64 is used to steer the focal spot of the build beam 66 over the exposed resin R in an appropriate pattern. The exposed layer of the resin R is exposed to the radiant energy which selectively cures resin R as described above, and joins it to the previously-cured layer above.

Optionally, a scanned beam apparatus may be used in combination with a projector. For example, a scanned beam apparatus may be used to apply radiant energy (in addition to that applied by the projector) by scanning one or multiple beams over the surface of the uncured resin R. This may be concurrent or sequential with the use of the projector.

Either curing method (projector or scanned) and either build method results in a component 74 in which the filler (if used) is held in a solid shape by the cured resin R. In this component, no further migration of the filler particles is expected or desired, and the gradation created during the curing process is fixed. This component may be usable as an end product for some conditions. Subsequent to the curing step, the component 74 may be removed from the stage 14.

If the end product is intended to be composed of the filler (e.g. purely ceramic, glass, metallic, diamond, silicon, graphite, etc.), the component 74 may be treated to a conventional sintering process to burn out the resin R and to consolidate the ceramic or metallic particles. Optionally, a known infiltration process may be carried out during or after the sintering process, in order to fill voids in the component with a material having a lower melting temperature than the filler. The infiltration process improves component physical properties.

The method described above results in a component 74 comprising a plurality of layers, wherein each layer is functionally graded, or stated another way, a compositional gradient extends across each layer. As an alternative, multiple layers could be produced from a single fill of settled resin R in a vat 11. In this process, the less-buoyant particles would be consumed during earlier cycles, thus resulting in a functionally-graded structure in the completed component.

This process is illustrated with reference to FIGS. 5-9. FIG. 5 illustrates a vat 11 having a build surface 22, containing resin R with two groups of particles P1 and P2. Consistent with the description above, particles P2 are less buoyant and thus maintain a position closer to the build surface 22. A stage 14 is shown positioned above the vat 11.

FIG. 6 shows the stage 14 positioned within the resin R at a selected layer increment above the build surface 22. The layer increment in the resin composition is such that this first layer 86 when cured, will include (exclusively or mostly) particles P2, as seen in FIG. 7.

FIG. 7 shows the stage 14 with the first layer 86 attached thereto and positioned within the resin at a selected layer increment above the build surface 22. As some of the particles P2 have been consumed in producing the first layer 86, a second layer 88, when cured, will include mostly particles P2, with some particles P1 included, as seen in FIG. 8. It should be noted that some mixing of the layers may occur when the stage is moved. If a mixed layer is desirable, it can be cured immediately, as shown in FIG. 7. Otherwise, it may be necessary for some time to pass to allow the layers to re-settle into their desired strata.

FIG. 8 shows the stage 14 with the first and second layers 86, 88 attached thereto and positioned within the resin R at a selected layer increment above the build surface 22. As essentially all of the particles P2 have been consumed in producing the first layer 86 and the second layer 88, a third layer 90, when cured, will include solely particles P1, as seen in FIG. 9. The completed component 174 is thus functionally graded, with each layer including a different distribution of particles P1 and P2. As compared to the component 74 described above, the component 174 is a gradient extending over the entirety of the component rather than over the layer increment.

Optionally, either of the methods of making a functionally graded component described above could be combined with conventional additive manufacturing methods to produce a component having one or more functionally graded portions, regions, or sections, and one or more non-graded portions, regions, or sections. For example, one or more layers of the component 74 or 174 could be made using a build cycle in which the resin R is deposited with either no filler or with filler including particles of substantially uniform physical properties, and/or with the settling step omitted, such that settling and gradation does not occur.

The method described herein has several advantages over the prior art. In particular, it allows functionally graded materials to be produced through additive manufacturing.

The foregoing has described a method and apparatus for additive manufacturing. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method for producing a functionally graded component layer-by-layer, comprising the steps of:

depositing resin on a build surface defined by a resin support, wherein the resin is radiant-energy-curable and contains filler including at least two groups of particles with different physical properties, wherein the resin support is a flexible foil defining the build surface;

allowing the filler to settle such that the at least two groups of particles separate from each other, so as to define at least two regions within the resin;

positioning a stage relative to the build surface so as to define a layer increment in the resin deposited on the build surface;

selectively curing the resin using an application of radiant energy in a specific pattern so as to define the geometry of a cross-sectional layer of the component;

moving the build surface and the stage relatively apart so as to separate the component from the build surface; and repeating at least the steps of positioning and selectively curing for a plurality of layers, until the component is complete.

2. The method of claim 1, further comprising, for each layer, repeating the step of depositing the resin and allowing the filler to settle, such that each layer is functionally graded.

3. The method of claim 2, wherein each layer includes a first, upper region containing particles of a first one of the groups and a second, lower region containing particles of a second one of the groups.

4. The method of claim 1, wherein the steps of positioning and selectively curing are repeated for a plurality of layers without adding additional resin to the build surface, such that the component as a whole is functionally graded.

5. The method of claim 1, wherein the particles of the at least two groups have different buoyancies.

6. The method of claim 1, wherein the particles of the at least two groups have different frictional properties.

7. The method of claim 1, wherein least a portion of the resin support is transparent and the radiant energy is applied through the resin support.

8. The method of claim 1, wherein the particles of the at least two groups have differing densities.

9. The method of claim 1, wherein the particles of the at least two groups have differing volumes.

10. The method of claim 1, wherein the particles of the at least two groups have differing shapes.

11. The method of claim 1, further comprising sintering the component to burn out the cured resin and consolidate the filler.

12. The method of claim 11, further comprising infiltrating a lower-melting-temperature material into the component during or after sintering.

13. The method of claim 1, wherein the application of radiant energy is applied by projecting a patterned image comprising a plurality of pixels.

14. The method of claim 13, wherein the patterned image is shifted during the application of radiant energy.

15. The method of claim 13, wherein additional radiant energy is applied by scanning at least one build beam over the surface of the resin.

16. The method of claim 1, wherein the radiant energy is applied by scanning a build beam over the surface of the resin.

17. The method of claim 1, further comprising cleaning at least one of the component and the stage, wherein the cleaning is carried out after the step of moving the build surface and the stage relatively apart.

18. The method of claim 17, wherein the step of cleaning includes contacting at least one of the component and the stage with a cleaning fluid.

19. The method of claim 1, further comprising executing a build cycle for at least one selected portion of the component, the build cycle including:

depositing resin on the build surface, wherein the deposited resin is radiant-energy-curable and optionally contains filler including particles with substantially uniform physical properties;

positioning the stage relative to the build surface so as to define a layer increment in the deposited resin;

selectively curing the deposited resin using an application of radiant energy in a specific pattern so as to define the geometry of a cross-sectional layer of the component;

moving the build surface and the stage relatively apart so as to separate the component from the build surface; and repeating at least the steps of positioning and selectively curing for a plurality of layers, such that selected portion of the component is not functionally graded.

* * * * *